United States Patent
Baldi et al.

(10) Patent No.: US 10,419,351 B1
(45) Date of Patent: Sep. 17, 2019

(54) SYSTEM AND METHOD FOR EXTRACTING SIGNATURES FROM CONTROLLED EXECUTION OF APPLICATIONS AND APPLICATION CODES RETRIEVED FROM AN APPLICATION SOURCE

(71) Applicant: Narus, Inc., Sunnyvale, CA (US)

(72) Inventors: Mario Baldi, Cuneo (IT); Yong Liao, Sunnyvale, CA (US); Stanislav Miskovic, San Jose, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 430 days.

(21) Appl. No.: 13/857,092

(22) Filed: Apr. 4, 2013

(51) Int. Cl.
*G06F 15/173* (2006.01)
*H04L 12/851* (2013.01)

(52) U.S. Cl.
CPC .................. *H04L 47/2441* (2013.01)

(58) Field of Classification Search
CPC ............. H04L 47/2441; H04L 47/2483; H04L 47/2475; H04L 47/04; H04L 47/10; H04L 69/22; H04L 63/0807; H04L 67/34; H04L 47/20; G06F 8/61; H04W 12/08
USPC .................................................. 709/224, 227
See application file for complete search history.

(56) References Cited

U.S. PATENT DOCUMENTS

| | | | | |
|---|---|---|---|---|
| 7,039,702 B1 * | 5/2006 | Churchyard | ............ | H04L 43/18 709/223 |
| 7,554,983 B1 * | 6/2009 | Muppala | ...................... | 370/392 |
| 7,620,807 B1 * | 11/2009 | Spatscheck | ............. | H04L 47/10 370/400 |
| 8,473,749 B1 * | 6/2013 | Madsen | ................... | H04L 67/34 713/187 |
| 2005/0138038 A1 * | 6/2005 | Betts | ...................... | H04L 67/327 |
| 2009/0241170 A1 * | 9/2009 | Kumar | ..................... | H04L 47/10 726/3 |
| 2011/0145920 A1 * | 6/2011 | Mahaffey | .............. | G06F 21/564 726/22 |
| 2012/0054841 A1 * | 3/2012 | Schultz | ................... | G06F 21/44 726/6 |
| 2013/0132559 A1 * | 5/2013 | Kotecha | .............. | H04L 43/0876 709/224 |
| 2013/0136127 A1 * | 5/2013 | Hill | ...................... | H04L 63/0245 370/392 |

(Continued)

*Primary Examiner* — William G Trost, IV
*Assistant Examiner* — Tan Doan
(74) *Attorney, Agent, or Firm* — Kwan & Olynick LLP (57) ABSTRACT

A method for classifying network traffic in a network. The method includes obtaining, from an application distribution source, an application distribution data set of comprising information associated with distributing an application from the pre-determined application distribution source, extracting, based on a pre-determined extraction criterion, a token from the application distribution data set of the application, obtaining, from the network traffic, a plurality of flows generated by the application, extracting, in response to detecting the token in a flow of the plurality of flows, context information associated with the token in the flow, and generating an identification rule of the application based on the token and the context information, wherein the identification rule describes one or more rule steps to locate the token in the flow, wherein the network traffic is classified using at least the identification rule.

27 Claims, 4 Drawing Sheets

(56) References Cited

U.S. PATENT DOCUMENTS

2013/0246795 A1* 9/2013 Shinde .................... H04L 51/24
  713/176
2014/0064344 A1* 3/2014 Choi et al. .................... 375/222

* cited by examiner

SYSTEM AND METHOD FOR EXTRACTING SIGNATURES FROM CONTROLLED EXECUTION OF APPLICATIONS AND APPLICATION CODES RETRIEVED FROM AN APPLICATION SOURCE

BACKGROUND OF THE INVENTION

Identifying the flows generated by different application-layer protocols is of major interest for network operators. Such identification enables QoS (quality of service) engineering for different types of traffic, such as voice and video traffic, and enables specific applications such as traffic forensics applications, network security applications, etc. Moreover, it enables ISPs to control applications with a potential to use large amounts of resources, such as peer-to-peer (P2P) applications, to limit and/or control application traffic and usage. For enterprise networks, it is very important for administrators to know activities on their network, such as services that users are running, the applications dominating network traffic, etc.

Throughout this disclosure, the term "flow" refers to a sequence of packets exchanged between two network nodes, referred to as a source and a destination of the flow where the source or the destination may be the originator of the exchange. Generally, in an IP network, such as the Internet, a flow is identified by a 5-tuple of <source IP address, destination IP address, source port, destination port, protocol> where the payload of the flow may be represented by a string of alphanumeric characters and other sequences of bits.

SUMMARY

In general, in one aspect, the invention relates to a method for classifying network traffic in a network. The method includes obtaining, from a pre-determined application distribution source, an application distribution data set of an application executing in the network, wherein the application distribution data set comprises information associated with distributing the application from the pre-determined application distribution source, extracting, based on a pre-determined extraction criterion, a token from the application distribution data set of the application, obtaining, from the network traffic, a plurality of flows generated by the application, extracting, by a computer processor and in response to detecting the token in a flow of the plurality of flows, context information associated with the token in the flow, and generating, by the computer processor, an identification rule of the application based on the token and the context information, wherein the identification rule describes one or more rule steps to locate the token in the flow, wherein the network traffic is classified using at least the identification rule.

In general, in one aspect, the invention relates to a system for classifying network traffic in a network. The system includes (i) a hardware processor, (ii) memory storing instructions executable by the hardware processor, the instructions comprising (a) an acquisition module executing on the hardware processor and configured to obtain, from a pre-determined application distribution source, an application distribution data set of an application executing in the network, wherein the application distribution data set comprises information associated with distributing the application from the pre-determined application distribution source, and obtain, from the network traffic, a plurality of flows generated by the application, (b) a data extractor executing on the hardware processor and configured to extract, based on a pre-determined extraction criterion, a token from the application distribution data set of the application, and extract, in response to detecting the token in a flow of the plurality of flows, context information associated with the token in the flow, and (c) an identification rule generator executing on the hardware processor and configured to generate an identification rule of the application based on the token and the context information, wherein the identification rule describes one or more rule steps to locate the token in the flow, and (iii) a repository for storing the application distribution data set, the token, and the identification rule, wherein the network traffic is classified using at least the identification rule.

In general, in one aspect, the invention relates to a non-transitory computer readable medium storing instructions for classifying network traffic in a network. The instructions, when executed by a processor of a computer, comprise functionality for obtaining, from a pre-determined application distribution source, an application distribution data set of an application executing in the network, wherein the application distribution data set comprises information associated with distributing the application from the pre-determined application distribution source, extracting, based on a pre-determined extraction criterion, a token from the application distribution data set of the application, obtaining, from the network traffic, a plurality of flows generated by the application, extracting, in response to detecting the token in a flow of the plurality of flows, context information associated with the token in the flow, and generating an identification rule of the application based on the token and the context information, wherein the identification rule describes one or more rule steps to locate the token in the flow, wherein the network traffic is classified using at least the identification rule.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a method, system, and computer readable medium for network traffic classification that can be applied to application. Specifically, for each incoming flow observed on a network, a classifier attempts to map the flow to the application from which the flow is generated.

Generally, the term "flow" may refer to a unidirectional flow or a bi-directional flow. A unidirectional flow includes only data packets traveling in one direction, either from server node to client node or vice versa. A bi-directional flow includes data packets traveling in both directions from server node to client node, and vice versa. The originator of the flow may be the server node or the client node. A bi-directional flow includes a combination of two unidirectional flows traveling in opposite directions. In one or more embodiments, a bi-directional flow is classified by classifying the two unidirectional flows separately. Classifying the network traffic based on unidirectional flows provides a solution to the routing asymmetry at the Internet backbone, where one direction of a flow is often missing. Using unidirectional flows allows the classifier to be deployed anywhere in the network.

Mobile applications are generally distributed through an on-line system for searching and downloading them. Example systems include Android© Market and Google© Play Store for Android© applications, and iTunes© Store for Apple© iOS© applications. Such software application distribution sources maintain application related information, referred to as application metadata. For example, the application metadata may include text description of the application and typically includes the name, category, and other identifier of the application. The application metadata may be used in different contexts, such as displaying the applications on the mobile device, listing the application in the application store catalog, exchanging information and/or registering with a service, etc. In another example, the application metadata may also include data associated with application code when the application code is distributed (e.g., downloaded from the online software application distribution source). The software application distribution sources may also include FTP site operated by a private party.

In one or more embodiments, some application transmits an identifier (i.e., identifying data unique to the application) when the application registers with a service during execution. In one or more embodiments, information transmitted during registration is analyzed to identify syntax or other empirical rule describing how the application transmits the identifier. For example, the analysis may be performed across multiple execution runs during a training phase. The identified syntax or empirical rule is referred to as an identification rule. During a classification phase, the identification rule is used to locate the application identifier within a new flow of the network traffic in real time.

Identification rules may be in different formats. In one or more embodiments, the format is based on a regular expression. For example, the regular expression may include traffic tags or string fragments that precede identifying data (i.e., identifier) unique to a mobile application. Depending on the user device executing the application or the software application distribution source where the application is obtained, the application's identifier may indicate only the application's name (e.g., Android© application) or provide a more complete set of application information (e.g., iOS© application), indicating the internal and displayed application names, application launching strings, application developers, etc.

The reasons that applications report their identifier in their traffic are diverse, such as enabling application developers to generate revenue from advertisement services, enabling application performance monitoring, or enabling the applications to obtain a specific content, etc. Generally, the traffic tags preceding applications' identifiers are common to a number of applications developed on a similar development framework or sharing a similar set of services. Accordingly, in one or more embodiments, a large number of applications are identified via a proportionally small number of identification rules.

The application identifier reporting may be based the HTTP protocol. An example of an identification rule is an URI in an HTTP transaction including a key-value pair "&bid=551953114&", where "bid" is the tag of the identification rule and "551953114" is the app-market ID (application identifier) for the application "Prova gli Occhiali".

Figure 1:
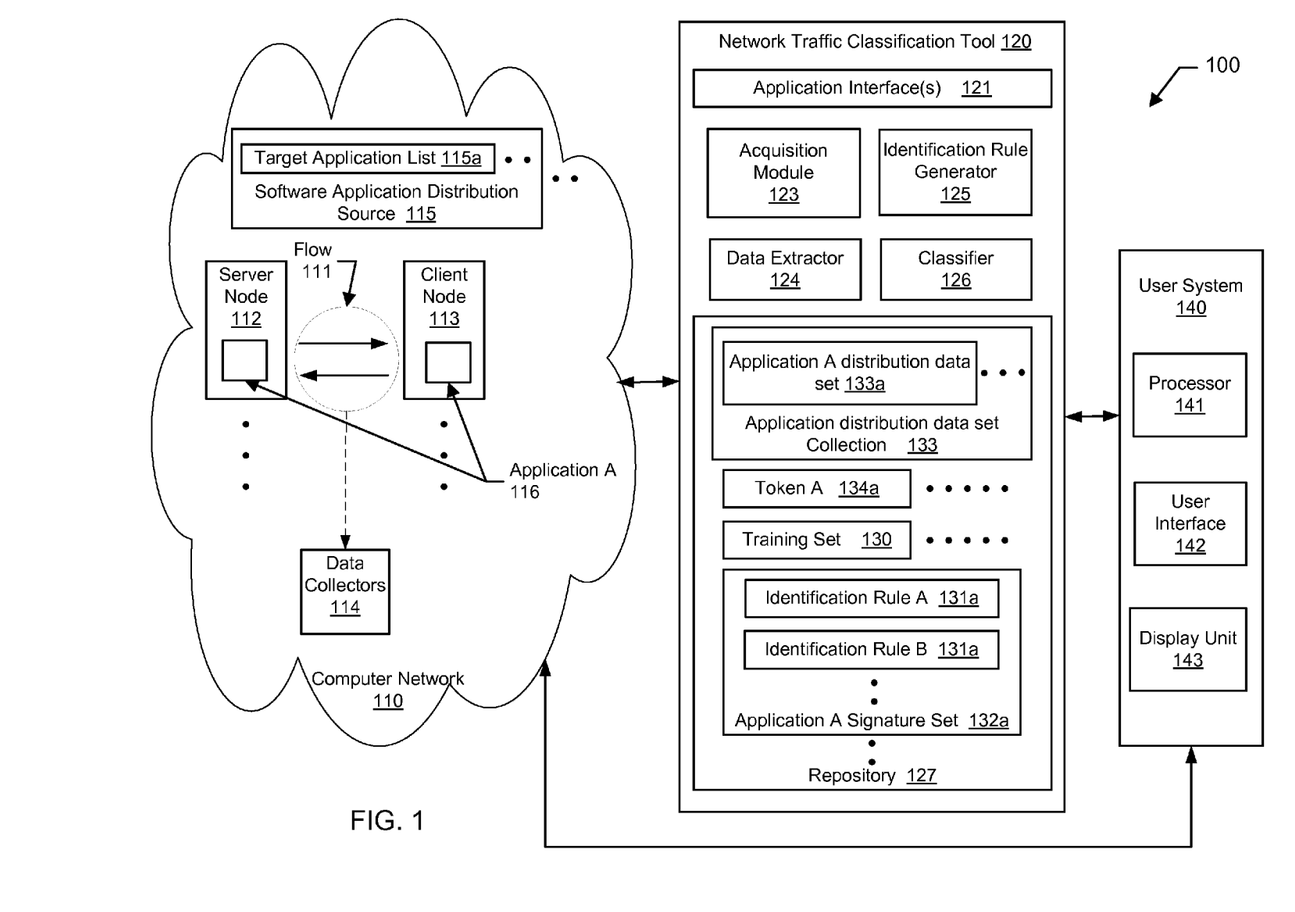
FIG. 1 shows a system block diagram according to aspects of the invention.

FIG. 1 shows a diagram of a system (100) for network traffic classification and application/traffic profiling in accordance with one or more embodiments. In one or more embodiments of the invention, one or more of the components shown in FIG. 1 may be omitted, repeated, and/or partitioned in a different manner. Accordingly, embodiments of the invention should not be considered limited to the specific arrangements of components shown in FIG. 1.

As shown in FIG. 1, the system (100) includes a network traffic classification tool (120), a user system (140), and a computer network (110). The network traffic classification tool (120) includes data repository (127), one or more application interfaces (121), acquisition module (123), data extractor (124), identification rule generator (125), and classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. In one or more embodiments, the computer network (110) is a communications network. For example, the computer network (110) may also include one or more of cellular communications network, satellite communications network, or other mobile communications network.

Further, the computer network (110) includes network nodes (e.g., server node (112), client node (113), data collectors (114), software application distribution source (115), etc.), which are the devices configured with computing and communication capabilities for executing, monitoring, or distributing applications in the network (110). As shown in FIG. 1, the server node (112) and client node (113) communicate with each other by exchanging data packets forming a flow (111), which includes two unidirectional flows represented by two arrows. Although shown as a bi-directional flow in the example depicted in FIG. 1, the flow (111) may also be a single unidirectional flow in other examples. In one or more embodiments, the server node (112) and the client node (113) exchange data packets in the flow (111) as a result of an application A (116) executing on the server node (112) and the client node (113). For example, a server portion and/or a client portion of the application A (116) is installed on the server node (112) and/or the client node (113). In this context, the flow (111) is referred to as being generated by the application A (116) executing on the server node (112) and client node (113). In one or more embodiments, the client node (113) may be a mobile device, such as a smartphone, a tablet computer, a hand held gaming device, etc. In such embodiments, the application A (116) is referred to as a mobile application mobile app, or app. In one or more embodiments, certain device(s) (e.g., data collectors (114)) within the computer network (110) may be configured to collect network data (e.g., flow (111)) for providing to the network traffic classification tool (120). In one or more embodiments, certain device(s) (e.g., software application distribution source (115)) within the computer network (110) may be configured to distribute software applications, for example to the server node (112) and/or client node (113).

Each of these components is described below. One of ordinary skill in the art will appreciate that embodiments are not limited to the configuration shown in FIG. 1.

In one or more embodiments of the invention, the network traffic classification tool (120) is configured to interact with the computer network (110) using one or more of the application interface(s) (121). The application interface (121) may be configured to receive data (e.g., flow (111)) from the computer network (110) and/or store received data to the data repository (127). Such network data captured over a time period (e.g., an hour, a day, a week, etc.) is referred to as a trace or network trace. Network trace contains network traffic data related to communications between nodes in the computer network (110). For example, the network trace may be captured on a routine basis using the data collectors (114) and selectively sent to the application interface (121) to be formatted and stored in the repository (127) for analysis. For example, the data collectors (114) may be a packet analyzer, network analyzer, protocol analyzer, sniffer, netflow device, semantic traffic analyzer (STA), or other types of data collection devices that intercept and log data traffic passing over the computer network (110) or a portion thereof. In one or more embodiments, the data collectors (114) may be deployed in the computer network (110) by a network communication service provider (e.g., ISP), a network security service provider, a cellular service provider (CSP) or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic classification tool (120).

In one or more embodiments, the software application distribution source (115) may be part of the aforementioned on-line system for searching and downloading software applications. As shown, a portion of applications distributed by the software application distribution source (115) are listed in the target application list (115a). For example, the software application distribution source (115) may be a software download server device of the Android© Market, Google© Play Store, or iTunes© Store. In one or more embodiments, the application (116) installed on the client node (113) is an application downloaded from the software application distribution source (115). In particular, the application A (116) is listed in the target application list (115a). The software application distribution source (115) may also be a FTP site operated by a private party.

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic classification tool (120). The user may include, but is not limited to, an individual, a group, an organization, or some other entity having authority and/or responsibility to access the network traffic classification tool (120). Specifically, the context of the term "user" here is distinct from that of a user of the computer network (110) or a user of the application executing on the sever node (112) and the client node (113). The user system (140) may be, or may contain a form of, an internet-based communication device that is capable of communicating with the application interface (121) of the network traffic classification tool (120). Alternatively, the network traffic classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic classification tool (120) (e.g., report, alert, etc.), including intermediate and/or final results of the signature set selection process.

As shown, communication links are provided between the network traffic classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired, wireless, and a sequence of links separated by intermediate systems routing data units. In one or more embodiments, the network traffic classification tool (120), the user system (140), and the communication links may be part of the computer network (110).

In one or more embodiments, a central processing unit (CPU, not shown) of the network traffic classification tool (120) is configured (e.g., programmed) to execute instructions to operate the components of the network traffic classification tool (120). In one or more embodiments, the memory (not shown) of the network traffic classification tool (120) is configured to store software instructions for analyzing the network trace to extract tokens, generating classification signatures, and classifying new flows captured from the network traffic to identify the application(s) that generates the new flows. The memory may be one of a variety of memory devices, including but not limited to random access memory (RAM), read-only memory (ROM), cache memory, and flash memory. The memory may be further configured to serve as back-up storage for information stored in the data repository (127).

The network traffic classification tool (120) may include one or more system computers, which may be implemented as a server or any conventional computing system having a hardware processor. However, those skilled in the art will appreciate that implementations of various technologies described herein may be practiced in other computer system configurations known to those skilled in the art.

In one or more embodiments, the network traffic classification tool (120) is configured to obtain and store data in the data repository (127). In one or more embodiments, the data repository (127) is a persistent storage device (or set of devices) and is configured to receive data from the computer network (110) using the application interface (121). The data repository (127) is also configured to deliver working data to, and receive working data from, the acquisition module (123), data extractor (124), identification rule generator (125), and classifier (126).

As shown in FIG. 1, the data repository (127) stores the application distribution data set collection (133) having application A distribution data set (133a), etc., a number of tokens (e.g., token A (134a)), one or more training set (e.g., training set (130)), and the application signature set (132a) having identification rule A (131a), identification rule B (131b), etc. as signatures contained therein. The data repository (127) may be a data store (e.g., a database, a file system, one or more data structures configured in a memory, some other medium for storing data, or any suitable combination thereof), which may include information (e.g., training set (130), application signature set (132a), etc.) related to the network traffic classification. The data repository (127) may be a device internal to the network traffic classification tool (120). Alternatively, the data repository (127) may be an external storage device operatively connected to the network traffic classification tool (120).

In one or more embodiments, the network traffic classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network traffic classification tool (120) is configured to support various data formats provided by the user system (140).

In one or more embodiments, the network traffic classification tool (120) includes the acquisition module (123) that is configured to obtain a network trace from the computer network (110), for example via data collectors (114). In one or more embodiments, the acquisition module (123) works in conjunction with the data collectors (114) (together referred to as a flow parser) to parse data packets and collate data packets belonging to the same flow tuple (i.e., the aforementioned 5-tuple) for flow reconstruction and for accumulating multiple flows to form the network trace. In one or more embodiments, the flows are captured and parsed throughout a pre-configured time interval recurring on a periodic basis (e.g., every minute, hourly, daily, etc.) or triggered in response to an event. Accordingly, such network trace, or information extracted therefrom, may then be stored in the repository (127) as training set (130), etc.

In one or more embodiments, flows (e.g., flow (117)) captured from the network (110) in the training set (130) may be screened to only include those being generated by the application A (116). In one or more embodiments, such screening may be performed by limiting the captured flows to the client node (113) that is dedicated as a testing device for the application A (116). In one or more embodiments, the client node (113) includes a mobile device or a mobile device emulator that is configured to execute the application A (116) by an automated tester. In one or more embodiments, the automated tester is a "clicking tool" that exercises (clicks) the various buttons/icons available in the user interface of the installed application according to a test sequence (i.e., a test suite). This is for activating execution patterns of the application. In one or more embodiments, the clicking (i.e., test sequence) follows a pattern that may be random, pre-recorded, or programmed, i.e., based on policies related to the screens, icons, buttons, and menus displayed as a result of the clicking. In one or more embodiments, multiple training sets are formed by varying the clicking sequence, the operating system running on the mobile device, the application version or other system and environmental parameter that may affect the traffic generated by the application. In another embodiment, the clicking tool is generating events of several different types, including but not limited to clicks, that can be accepted by the application. In another embodiment, the clicking is performed manually by a human tester or in combination with the actions of a clicking tool.

For the example of Android© platform, the aforementioned testing device may be based on Android© SDK tools, including Android© software emulator tool and the tool that enables generation of random events in the tested applications via adb (Android© debug bridge) interface to implement the aforementioned clicking tool. Specifically, the application A (116) is installed in multiple Android© software emulators running different versions of the Android© operating system, thus enabling identification of identification rules for a broad set of Android© devices. After the application A (116) is installed, the clicking tool is launched to generate a predefined number of random events for the application A (116). The traffic flows produced by these events as well as other execution activities of the application A (116) are included in the training set (130).

For the example of iOS© platform, the aforementioned testing device includes actual iOS© devices and a centralized software application for coordinating application downloading to these iOS© devices, extraction of application metadata, application execution, and application traffic logging. By employing wide selection of iOS© devices, the identification rules derived from the resultant training set (130) may apply to diverse iOS© platforms.

In one or more embodiments, the acquisition module (123) is further configured to obtain, from the software application distribution source (115), a number of application distribution data sets (e.g., application A distribution data set (133a)) forming the application distribution data set collection (133). In particular, each application distribution data set (e.g., application A distribution data set (133a)) in the application distribution data set collection (133) corresponds to an application (e.g., application (116)) listed in the target application list (115a). Specifically, the target application list (115a) represents those applications whose application distribution data sets have been retrieved by the acquisition module (123) from the software application distribution source (115). In one or more embodiments, the application A distribution data set (133a) includes one or more of application executable code, application byte code, application source code, and application metadata of the application (116). The application executable code, application byte code, and application source code are generally referred to as the application code set. In one or more embodiments, the application metadata includes metadata associated with the application (116) that is maintained by and downloadable from the software application distribution source (115). In one or more embodiments, the application metadata includes text descriptions posted by the software application distribution source (115) to introduce the application (116) to a user searching for an application suitable for his/her needs. In one or more embodiments, the application metadata includes text descriptions posted online (e.g., an application review website) by a third party (e.g., an application reviewer) to introduce or rate the application (116) to a user searching for an application suitable for his/her needs.

In one or more embodiments of the invention, the network traffic classification tool (120) includes the data extractor (124) that is configured to extract, from the application A distribution data set (133a), one or more extracted portion(s) to form a token (e.g., token A (134a)) of the application A distribution data set (133a). In one or more embodiments, different tokens are extracted from application distribution data sets of different applications.

In one or more embodiments, the data extractor (124) is further configured to detect whether any token (e.g., token A (134a), etc.) can be found in any flow in the training set (130). Accordingly, a flow (not shown) found to contain the token A (134a) may be processed by the data extractor (124) to extract a context associated with the token A (134a) in the flow. For example, the context may be a syntax field (e.g., query field, header field, etc.) in the flow where the token A (134a) is located, a semantically meaningful string (e.g., "name", "id", etc.) in the flow adjacent to where the token A (134a) is located, or a statistically co-occurring data segment in the flow adjacent to where the token A (134a) is located. In one or more embodiments, the extracted context is analyzed by the identification rule generator (125) to generate an identification rule (e.g., identification rule A (131a)) describing the heuristics of how to locate the token based on the context in a flow. In one or more embodiments, a different identification rule (e.g., identification rule B (131b)) describes the heuristics of how to locate a different token in a flow generated by a different application.

In one or more embodiments, the extracted portions is extracted from the application code set or metadata based on pre-determined delimiters (i.e., separators), such as "&", "/", "=", "?", "#", EOL, etc. A particular type of extracted portion is a Key-Value (K-V) pair that is included in the application A distribution data set (133a). An example K-V pair may have the key as a host name or a domain name, while the value is a substring delimited by {"?", "#", EOL}. In one or more embodiments, a token is a sequence of K-V pairs. In another embodiment, a token is a portion of a K-V pair. In one or more embodiments a token is at least one of a key, a portion of a key, a value, a portion of a value. In one or more embodiments, the K-V pairs are found in the query part of an HTTP URL. In one or more embodiments, the K-V pairs are also found in at least one of the headers and the body of an HTTP message, e.g., in a JSON dictionary, an XML formatted document, a JAVA© dictionary, etc. known to those skilled in the art. In general, K-V pairs include following categories: web-object-dependent K-V pairs, run-dependent K-V pairs, application-dependent K-V pairs, developer-dependent K-V pairs, and platform-dependent K-V pairs.

In one or more embodiments, the token A (134a) is a character string (or any other data pattern described above) found in the application code set or meta data. For example, the token A (134a) may be found as preceded by the pre-determined string of "name=" in a flow in the training set (130) where the flow includes the URL of HTTP requests sent using the GET method to a host. Because a string following "name=" is known to be the name of the application A (116), the heuristics of how to locate the token A (134a) as the identifier of the application A (116) in a flow is based on the expression "name=*". Specifically, the expression "name=*" represents the extracted context, where "*" is a wildcard representing any string of character or byte to be used as the application identifier.

In another example, the token A (134a) may found as preceded by the pre-determined string of "idCode=" in a flow in the training set (130) where the flow includes the URL of HTTP requests sent using the PUT method to another host Because a string following "idCode=" is known to be the identification code of the application A (116), this identification code can be used to look up the name of the application A (116) from a name directory of the software application distribution source (115). In this example, the expression "idCode=*" represents the extracted context, where "*" is a wildcard representing any string of character or byte to be used as the application identification code.

In one or more embodiments, the token A (134a) is a character string (or any other data pattern described above) found in the application A distribution data set (133a) that cannot be found in any other application distribution data set that does not belong to the application A (116) in the application distribution data set collection (133). For example, the token A (116) may be identified by comparing the application A distribution data set (133a) to all other application distribution data sets that do not belong to the application A (116) in the application distribution data set collection (133). In one or more embodiments, the token A (134a) may include multiple substrings found in the application A distribution data set (133a) and is represented mathematically as a vector having substrings as its elements. In one or more embodiments, token A is identified based on specific knowledge about the application, such as usage of IP addresses hostnames, or domain names.

To reduce the computing resources required to compare the application distribution data sets, the application distribution data set collection (133) and the target application list (115a) may be restricted in the number of included applications. In one or more embodiments, traffic flows generated by the controlled execution of selected applications from the software application distribution source (115) but not included in the target application list (115a) are checked to see if the token A (134a) is transmitted by any of these selected applications. If the token A (134a) is also found in these traffic flows not related to the application A (116), the token A (134a) is excluded from consideration as it is not unique to the application A (116).

In one or more embodiments, the token A (134a) includes specific character strings or byte sequences of a pre-determined format in the application distribution data set (133a). For example, the token A (134a) may include a string in the form of an IP address in dotted decimal notation "x.y.z.w", where each of the x, y, z, and w is a string representing a number between 0 and 255. If such a token A is found in the application A distribution data set (133a), then it is searched for in the application A's training set (130). If it is found, the context is identified and an identification rule for locating it in live traffic traces is constructed based on such context. For example, if address 1.2.3.4 is identified in the application distribution data set (133a) and is found in the hostname field of a GET request, a regular expression "hostname: 1.2.3.4" is used in the identification rule A (131a) for application A if this regular expression cannot be matched in the training set of any other application. In another example, the token A (134a) may include a string in the form of a host name: x.y, where y is one of the well known top level domains (e.g., .com, .net, .it) and x is a string. In one or more embodiments, the token A (134a) is identified by a set of regular expressions formulated to describe pre-determined sequences of bytes or sequences of characters. For example, the identification rule A (131a) to locate token A (134a) may include a hostname described by the regular expression: [0-255].[0-255].[0-255].[0-255].

In one or more embodiments, the token A (134a) includes a sequence of N bytes in the application A distribution data set (133a), with N varying from 1 to the size of the code. Identification and extraction of such token requires a high computational complexity and is paired with techniques to ensure the uniqueness of the token A (134*a*), i.e., not being present in and transmitted by any other applications. Generally, various formats of the token A (134*a*) described above form a syntax or empirical rule, referred to as an identification rule In one or more embodiments of the invention, the network traffic classification tool (120) includes the identification rule generator (125) that is configured to generate an application signature set (132*a*) for various applications executing in the network (110). For example, the identification rule A (131*a*) is generated by the identification rule generator (125) as the signature of the application A (116). In one or more embodiments, the identification rule A (131*a*) is generated in a training phase (also referred to as a regression phase) containing one or more training sessions where a set of representative flows is captured from the application A (116) during each training session. Each set of representative flows is referred to as a training set. For example, the identification rule A (131*a*) may be generated from multiple training sets (e.g., training set (130), etc.) each including a set of representative flows generated by the application A (116) during one training session. In one or more embodiments, the identification rule A (131*a*) is generated based on the aforementioned regular expression identifying, in the flows in the training set (130), the token A (134*a*) initially found in the application A distribution data set (133*a*). Specifically, a regular expression meeting a pre-determined criterion is used as an identification rule. In one or more embodiments, a regular expression is identified as an identification rule for identifying the application only if the regular expression is sufficiently different from other regular expressions derived from a set of other applications, such as all other applications tracked in the application distribution data set collection (133).

In one or more embodiments, the identification rule A (131*a*) is extended to a set of applications. Each specific application is identified by information that can be extracted by applying the identification rule A (131*a*). For the example where the regular expression "name=*;" in the URL of HTTP requests sent using the GET method to a host is used to locate the token A (134*a*) in the flows of the training set (130), the identification rule A (131*a*) as the signature of the application A 1116) is the following:

(a) Identify a HTTP GET request sent to a host.

(b) Search for "name=" followed by a string and then ";" in the URL of the HTTP request sent using the GET method to the host.

(c) Once found, the string following "name=" and preceding ";" is the name of the application having generated the flow of the HTTP GET request.

For the example where the regular expression "idCode=*&" is used to locate the token A (134*a*) in the flows of the training set (130), the identification rule A (131*a*) as the signature of the application A 1116) is the following:

(a) Identify a HTTP PUT request sent to a host.

(b) Search for "idCode=" followed by a string and then "&" in the URL of the HTTP request sent using the PUT method to the host.

(b) Once found, the string following "idCode=" and preceding the character "&" is the application identification code of the application having generated the flow of the HTTP PUT request.

(c) Look up the application identification code in the application distribution data set collection (133) to identify the application whose application distribution data set (i.e., application code set or application metadata) contains the application identification code. Alternatively, the application identification code is used to look up the name of the application from a name directory of the software application distribution source.

As noted above, the two example rules above is not limited to only application A (116). but may be expended to other applications that share the same behavior of sending their names to the same host.

In one or more embodiments, the identification rule generator (125) is configured to generate the application signature set (132*a*), e.g., the identification rule A (131*a*), using the method described in reference to FIG. 2 below.

In one or more embodiments of the invention, the network traffic classification tool (120) includes the classifier (126) that is configured to classify a new flow (e.g., flow (111)) or a new flow set (containing multiple flows) obtained from the network traffic. In one or more embodiments, a new flow or a new flow set are matched against the regular expressions of a signature set and if they match it, the new flow or flow set is identified as being generated by the application associated with the matching signature set.

While specific components are depicted and/or described for use in the units and/or modules of the network traffic classification tool (120), it will be appreciated that a variety of components with various functions may be used to provide the formatting, processing, utility and coordination functions necessary to modify various working data used by the network traffic classification tool (120). The components may have combined functionalities and may be implemented as software, hardware, firmware, or combinations thereof.

Figure 2A:
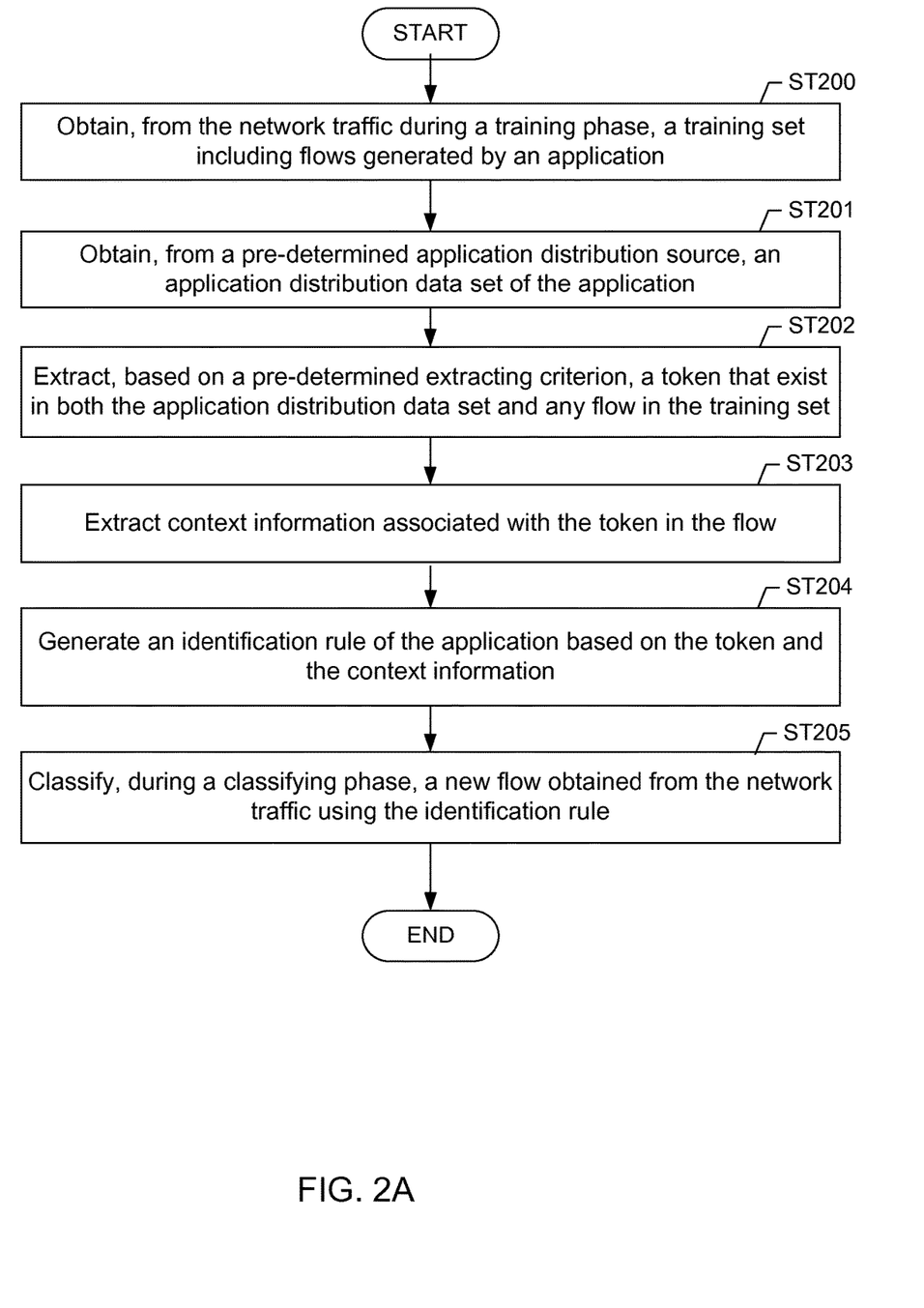
FIGS. 2A and 2B show method flow charts according to aspects of the invention.
Figure 2B:
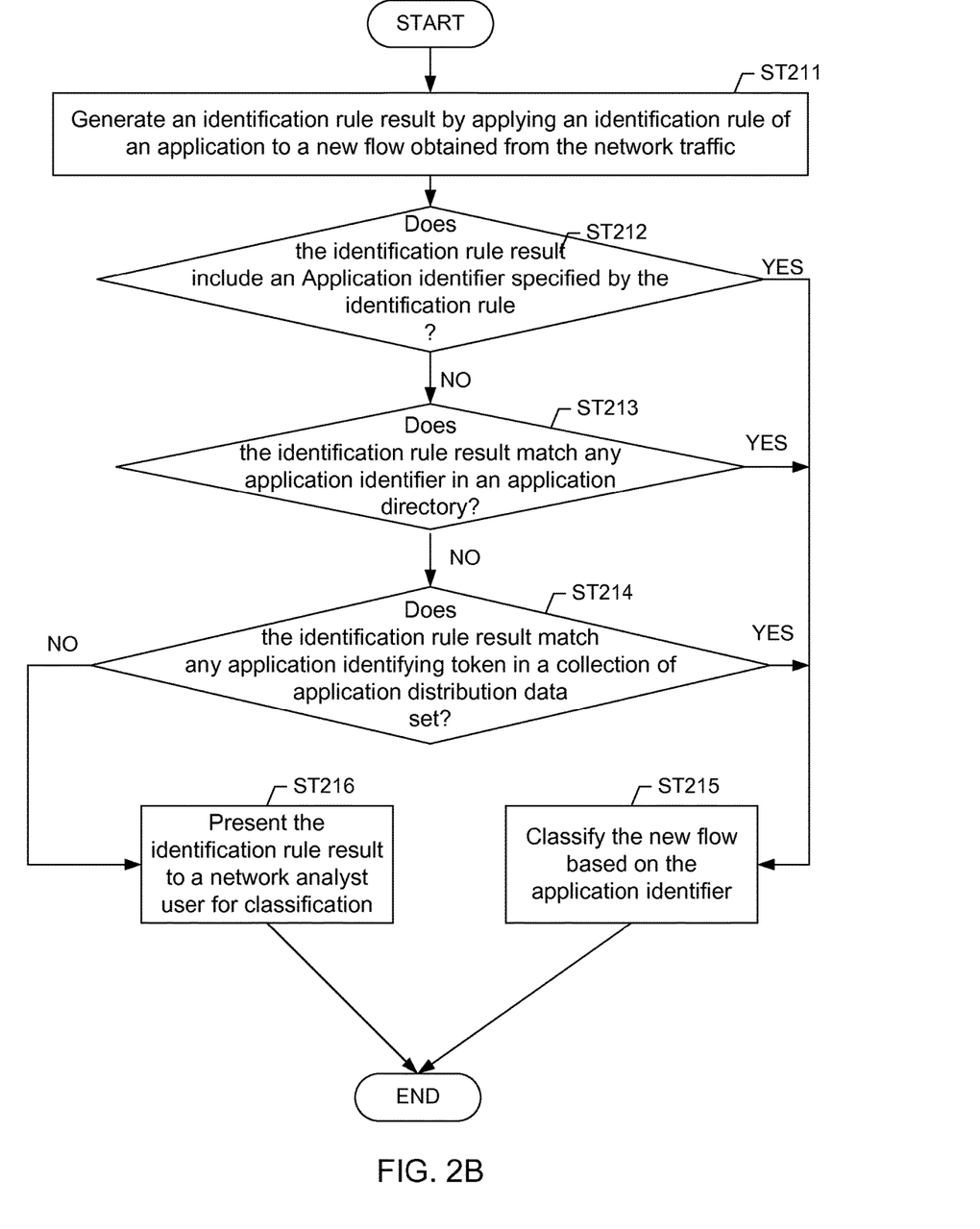

FIGS. 2A-2B depict flowcharts of methods in accordance with one or more embodiments of the invention. In one or more embodiments of the invention, one or more of the steps shown in FIGS. 2A-2B may be omitted, repeated, and/or performed in a different order. Accordingly, embodiments of the invention should not be considered limited to the specific arrangements of steps shown in FIGS. 2A-2B. In one or more embodiments of the invention, the methods depicted in FIGS. 2A-2B may be practiced using system (100) described with respect to FIG. 1 above.

Generally, the method depicted in FIG. 2A is used to classify network traffic in a network by first generating, during a training phase, an identification rule of an application executing in the network. The method depicted in FIG. 2B is used to determine a new flow as being generated by a particular application by applying the identification rule to the new flow and analyzing a result.

As shown in FIG. 2A, initially in Step 200, a collection of flows generated by an application are captured to form a training set of the application. In one or more embodiments, the application is installed on a mobile device or a mobile device emulator to be executed using an automated tester. In one or more embodiments, the automated tester is a "clicking tool" that exercises (clicks) the various buttons/icons available in the user interface of the installed application according to a test sequence (i.e., a test suite). This is for activating execution patterns of the application. In one or more embodiments, the clicking (i.e., test sequence) follows a pattern that may be random, pre-recorded, or programmed, i.e., based on policies related to the screens, icons, buttons, and menus displayed as a consequence of the clicking. In another embodiment, the clicking tool is generating events of several different types, including but not limited to clicks, that can be accepted by the application. In another embodiment, the clicking is performed manually by a human tester or in combination with the actions of a clicking tool.

In Step 201, an application distribution data set of an application is obtained from a software application distribution source. For example, the software application distribution source may be a software download server device of the Android© Market, Google© Play Store, or iTunes© Store. In one or more embodiments, the application distribution data set includes one or more of application executable code, application byte code, application source code, and application metadata of the application. The application executable code, application byte code, and application source code are generally referred to as the application code set. In one or more embodiments, the application metadata includes metadata associated with the application that is maintained by and downloadable from the software application distribution source. In one or more embodiments, the application metadata includes text descriptions posted by the software application distribution source to introduce the application to a user searching for an application suitable for his/her needs. In one or more embodiments, the application metadata includes text descriptions posted online (e.g., an application review website) by a third party (e.g., an application reviewer) to introduce or rate the application to a user searching for an application suitable for his/her needs.

In Step 202, a token that exists in both the application distribution data set of the application as well as any flow in the training set is extracted based on a pre-determined extraction criterion. In one or more embodiments, the token that co-exist in both the application distribution data set and the training set is referred to as an application identifying token. In one or more embodiments, to systematically identify applications based on tokens, relevant tokens are screened to eliminate irrelevant tokens, which are those tokens providing no information about application identity. In one or more embodiments, irrelevant tokens may be eliminated based on a pre-determined blacklist.

In one or more embodiments, a candidate token is initially extracted as one or more extracted portion(s) of the application distribution data set. For example, the extraction criterion may specify a candidate token to be a particular length, in a particular syntax field, or preceded by a pre-determined semantically meaningful string. In other words, the extracted candidate token may be any portion of the application distribution data set that meets the length criterion, the syntax field criterion, or the semantic string criterion. The extracted candidate token is then compared to the training set to search for a match. If no match is found, another candidate token meeting the same criterion is extracted and compared to the training set, and so on so for the until at least on candidate token is found to exist in the training set. Accordingly, this candidate token is chosen as the token. In another example, the extraction criterion may specify a longest common substring (LCS) found by matching the application distribution data set to the training set using a LCS algorithm known to those skilled in the art. In one or more embodiments, if no token can be detected that coexist in both the application distribution data set and any flow in the training set, the extraction criterion is adjusted until at least one token can be detected in both the application distribution data set and the training set. For example, the criteria of token length, the type of syntax field, or the content of the pre-determined semantically meaningful string may be adjusted to detect such token.

In Step 203, in response to detecting/extracting the token from both the application distribution data set and a flow in the training set, context information associated with the token within the flow is extracted from the flow. For example, the context may be a syntax field (e.g., query field, header field, etc.) in the flow where the token is located, a semantically meaningful string (e.g., "name", "id", etc.) in the flow adjacent to where the token is located, or a statistically co-occurring data segment in the flow adjacent to where the token is located. Additional details of different types of token are described in reference to FIG. 1 and an application example depicted in TABLE 1 below.

For HTTP based applications, pre-allocated "query" field (i.e., a syntax field) has already been standardized in Universal Resource Identifier (URI) embedded in HTTP traffic. Examples of the query field are shown in TABLE 1 below.

TABLE 1 foo://www.example.com:8042/over/there?name=ferret#nose scheme   authority              path         query    fragment As shown in TABLE 1, the authority field of the URI consists of a host name (i.e., www.example.com) and an optional port number (i.e., 8042); the host name consists of a domain name (i.e., example.com) and host identifier (i.e., www) within the domain. Further, the query field contains a K-V pair (i.e., K=name, V=ferret). Accordingly, one or more of the host name, domain name, K-V pair, etc. may be used as substrings to form the token. Further, the token may be composed from a combination of one or more portions of the URI identified by defining a set of separator symbols. For example, the URI may be broken into portions separated by symbols {"&","/","="}. A token may be the combination of two portions: a host name (or domain name) and substring delimited by {"?","#",EOL}. In another example, the substring "ferret" may be extracted as the token based on the syntax field "query" where it is located and the semantic meaningful string "name" adjacent to it.

TABLE 2

GET
/ping?ap_av=2.3.4.1&ap_id=20327cb3a98e82623afdf15c5aaf863d2
25b3ff9&ap_cr=Android&ap_ev=start&ap_la=en%5FUS&ap_pl=sdk&a
p_prm=market&ap pv=2.3.3&ap tz=GMT&ap tzg=Etc%2FUniversal&a
p_cn=mobile&ap v=1&h=com.aol.mobile.aim.android.application
&dm_dpi=240&dm_h=800&dm w=480&ts=1338440033 HTTP/1.1
User-Agent: AOL_AIM_Android/2.3.4.1 (Android; 10; 2.3.3;
101070; en-US)
Content-Language: en-US
Cache-Control: no-store, no-cache
Accept: */*
Accept-Encoding: gzip
Cookie:
MUNAUTHID=1.20327cb3a98e82623afdf15c5aaf863d225b3ff9.10a9
Host: b.aol.com
Connection: Keep-Alive TABLE 2 is an example of a portion of an HTTP GET message sent by the "AOL AIM" Android© application to server "b.aol.com". A set of substrings extracted using a predefined set of separators {"&", "/", "=", " ", ":", LF, CR} includes the substrings "AOL_AIM_Android," and "b.aol-.com", which are included as two term of a token and used to generate an identification rule for identifying flows generated by the Android© application "AOL AIM".

In Step 204, an identification rule of the application is generated based on the token and the context information. In one or more embodiments, the identification rule is expressed using an XML format to describe one or more rule steps to locate the token in a flow based on the context information. In one or more embodiments, the XML format for an identification rule includes the following blocks:
(i) Rule and platform identification block,
(ii) Rule priority block,
(iii) App metadata fields indicated by the rule block,
(iv) Match block,
(v) "Not-Match" block, and
(vi) Extraction block.

Each of the blocks, delimited in the XML format by an XML tag as shown in TABLE 4, is described below.

The Rule and platform identification block signifies the rule number and states whether the rule is, for example, for iOS© or Android© platform.

Rule priority block signifies how unique is the token identified by the identification rule. Some token types may not be unique to individual applications, i.e., the token may be similar for several applications. Therefore, the corresponding identification rules are assigned a lower priority. For example, there may be three levels of priority: HIGH, MEDIUM, and LOW.

App token block indicates all token types of a given priority the identification rule may point to. For example, a high-priority rule may point to two launcher-ID types of the application: softwareversionbundleid and cfbundleidentifier.

Match block and "Not-Match" block designate the strings in HTTP header fields or payloads that must or must not be present in a given flow for a given identification rule. Header fields or payloads have designated XML tags listed in TABLE 3 below.

Extraction block designates a regular expression that extracts a string from a flow to be identified. The extracted string is then used as a search phrase to identify the application by searching a collection of application distribution data sets. The block also indicates where the regular expression should be applied: HTTP header fields or payload. Header fields and payloads have designated XML tags listed in TABLE 3 below.

TABLE 3

XML reg-ex tags
<MET>
    METhod: The value inside the tag may be a name of one or more HTTP methods (GET, PUT, POST, HEAD, etc.) to which the rule applies.
<URI>
    URI: Slash-separated part of the GET URI. The value inside the tag is a regular expression to be matched.
<PAR>
    PARameters in the GET URI, i.e., key-value pairs stated in the URI. The value inside the tag is a regular expression to be matched.
<REF>
    REFerrer: The value inside the tag is a regular expression to be matched in the Referer field.
<HST>
    HoST name: The value inside the tag is a regular expression to be matched in the Host field.
<AGN>
    user AGeNt: The value inside the tag is a regular expression to be matched in the User-Agent field.
<TPL>
    RequesT PayLoad: Indicates that a match should be sought in the payload sent from the client to the server. The value inside the tag is a regular expression to be matched.
<EPL>
    responsE PayLoad: Indicates that a match should be sought in the payload sent from the server to the client. The value inside the tag is a regular expression to be matched.
<COO>
    COOkie: The value inside the tag is a regular expression to be matched in the Cookie field.
<SCO>
    Set Cookie: The value inside the tag is a regular expression to be matched in the Set-Cookie field.
<LOC >
    LOCation: The value inside the tag is a regular expression to be matched in the Location field.
<FNA>
    FileNAme: The value inside the tag is a regular expression to be matched in the Filename field.
<CLO>
    Content-LOcation: The value inside the tag is a regular expression to be matched in the Content-Location field.
<ALP>
    x-Apple-Lok-Path: The value inside the tag is a regular expression to be matched in Apple's proprietary HTTP header field x-apple-lok-path.
<APL_URL>
    x-apple-orig-url-path: The value inside the tag is a regular expression to be matched in Apple's proprietary HTTP header field x-apple-orig-url-path.
<APL_WO>
    x-apple-translated-wo-url: The value inside the tag is a regular expression to be matched in Apple's proprietary HTTP header field x-apple-translated-wo-url.
<APL_CX >
    X-BUNDLE-ID: The value inside the tag is a regular expression to be matched in Apple's proprietary HTTP header field X-BUNDLE-ID.

TABLE 3-continued

<APL_CV>
    X-Client-Version: The value inside the tag is a regular expression to be matched in Apple's proprietary HTTP header field X-Client-Version.

Based on the example tags listed in TABLE 3 above, TABLE 4 shows an example identification rule. The following high-priority rule is enumerated B1 for iOS© platform and it may point to softwareversionbundleid OR cfbundleidentifier metadata. The rule applies to GET or POST methods and the extracted token appears after "&bid=" tag in URI parameters, x-apple-lok-path field, x-apple-orig-url-path field, or x-apple-translated-wo-url field.

However, the rule should not be applied (based on the not-match block) if "&bid=" tag is followed by digits only.

TABLE 4

```
<MOBSIG>
<PLATFORM>iOS</PLATFORM>
<SIGID>B1</SIGID>
<SIG_PRIORITY>HIGH</SIG_PRIORITY>
<LOOKUP_DB_METADATA>softwareversionbundleid|cfbundleidentifier</LOOKUP_DB_M
ETADATA>
<MATCH>
<MET>GET|POST</MET>
</MATCH>
<NOTMATCH>
<PAR>&bid=\\d+[ &_\n]</PAR>
<ALP>&bid=\\d+[ &_\n</ALP>
<APL_URL>&bid=\\d+[ &_\n</APL_URL>
<APL_WO>&bid=\\d+[ &_\n</APL_WO>
</NOTMATCH>
<EXTRACTION>
<PAR>&bid=((\\w|\\.|-|_)+) + &\\x5e</PAR>
<ALP>&bid=((\\w|\\.|-|_)+) + &\\x5e</ALP>
<APL_URL>&bid=((\\w|\\.|-|_)+)[ &\\x5e]</APL_URL>
<APL_WO>&bid=((\\w|\\.|-|_)+)[ &\\x5e]</APL_WO>
</EXTRACTION>
</MOBSIG>
```

In one or more embodiments, the Steps 200-204 described above are performed during a training phase prior to classifying any flows in the network traffic. Subsequent to generating the identification rule of a particular application, the identification rule is used in a classifying phase to determine if a new flow is generated by the same application or not.

In Step 205, a new flow obtained from the network traffic is classified during the classifying phase using the identification rule of the application. In one or more embodiments, the classification is based on the method described in reference to FIG. 2B below.

In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments of the invention, the methods depicted in FIG. 2B may be practiced using system (100) described with respect to FIG. 1 above.

As shown in FIG. 2B, initially in Step 211, an identification rule result is generated by applying the identification rule to a new flow obtained from the network traffic during a classifying phase subsequent to the training phase. For example, the identification rule result may include a token extracted from the new flow, where the token may be extracted from a particular syntax field, preceded by a particular semantic string, or other conditions specified in the identification rule.

In Step 212, a determination is made as to whether the identification rule result includes an application identifier (e.g., application name or other application ID) specified by the identification rule. If the determination is positive or yes, the method proceeds to Step 215 where the new flow is classified as being generated by the application based on the application identifier specified in the identification rule. If the determination is negative or no, the method proceeds to Step 213.

In Step 213, a determination is made as to whether the identification rule result matches any application identifier (e.g., application name or other application ID) listed in an application directory. If the determination is positive or yes, the method proceeds to Step 215 where the new flow is classified as being generated by an application based on the application identifier matched in the application directory. This application may be the same application that the identification rule corresponds to, or a different application having similar behavior of including a similar application identifying token described by the identification rule. If the determination is negative or no, the method proceeds to Step 214.

In Step 214, a collection of application distribution datasets of various different applications are searched to determine whether any application distribution dataset contains an application identifying token (e.g., application name, application ID, or other string) matching the identification rule result. If the determination is positive or yes, the method proceeds to Step 215 where the new flow is classified as being generated by an application of which the application distribution dataset contains the application identifying token matching the identification rule result. This application may be the same application that the identification rule corresponds to, or a different application having similar behavior of including a similar application identifying token described by the identification rule. If the determination is negative or no, the method proceeds to Step 216.

In Step 216, the identification rule result is presented to a network analyst user for manual classification. In one or more embodiments, the network analyst user may adjust the identification rule based on the manual classification result such that the adjusted identification rule will classify the new flow automatically without user intervention. Accordingly, the adjusted identification rule is used for subsequent classification of additional new flows obtained from the network traffic.

Although specific formats, structures, or partitions are used as examples in the foregoing description regarding the various components in the network traffic classification tool, user system, and computer network, one skilled in the art, with the benefit of this disclosure, would recognize that other formats or structures may also be used in the system, methods, and examples described without deviating from the spirit of the invention.

Figure 3:
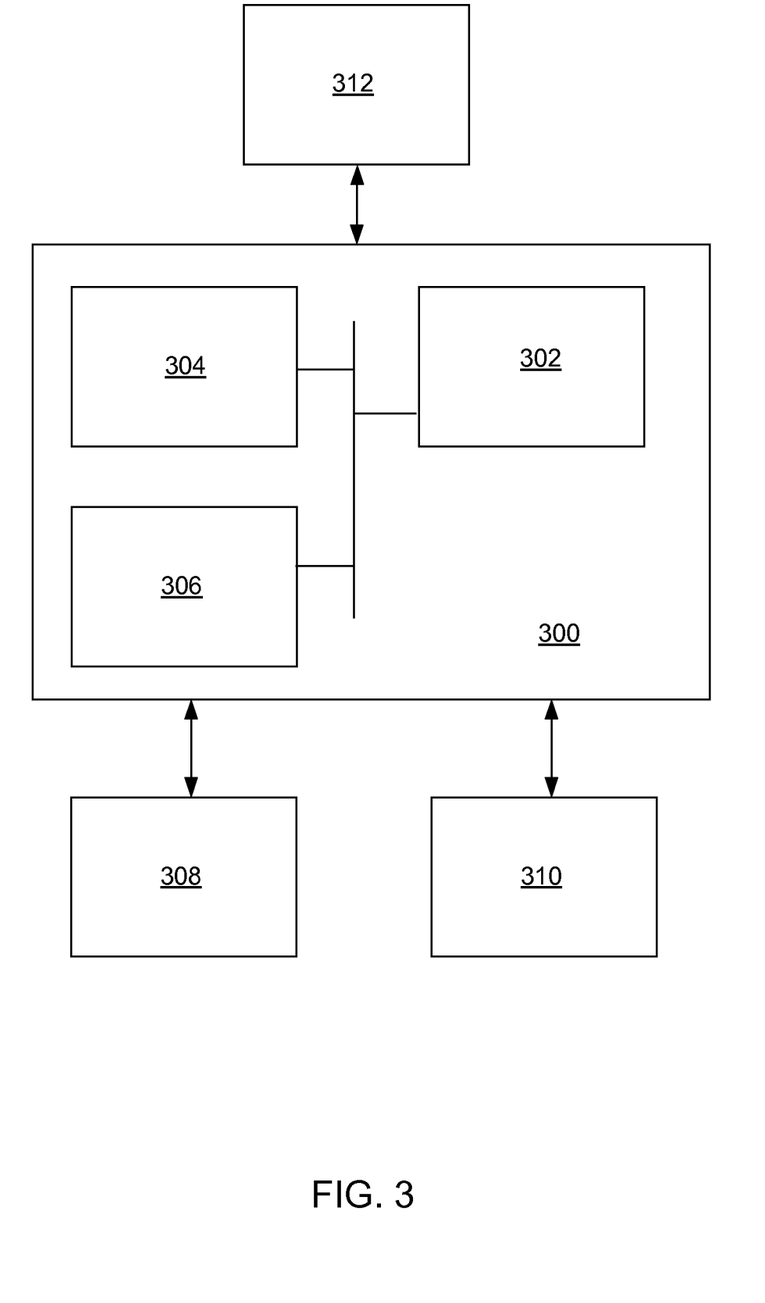
FIG. 3 shows a computer system according to aspects of the invention.

Embodiments of the invention may be implemented on virtually any type of computer regardless of the platform being used. For example, as shown in FIG. 3, a computer system (300) includes one or more processor(s) (302) (e.g., central processing unit or CPU), associated memory (304) (e.g., random document access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor) for example to display various results such as the tokens, the principal components, the application space, the signatures, etc. The computer system (300) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying network traffic in a network, comprising:
    obtaining, from a pre-determined application distribution source, an application distribution data set of an application executing in the network, wherein the application distribution data set comprises information associated with distributing the application from the pre-determined application distribution source;
    extracting, based on a pre-determined extraction criterion, a token from the application distribution data set of the application;
    obtaining, from the network traffic, a plurality of flows generated by the application;
    extracting, by a computer processor and in response to detecting the token in a flow of the plurality of flows, context information associated with the token in the flow;
    generating, by the computer processor, an identification rule of the application based on the token and the context information, wherein the identification rule is expressed in XML format in order to describe heuristics of how to locate the token in a new flow, the identification rule including all of the following blocks delimited in XML format: (i) Rule and platform identification block, (ii) Rule priority block, (iii) App metadata fields indicated by the rule block, (iv) Match block, (v) "Not-Match" block, and (vi) Extraction block, wherein generating the identification rule includes analyzing transmission information during registration of the application with a service to identify syntax or other empirical rules describing how the application transmits identifiers;
    applying the identification rule to a new flow from the network traffic; wherein applying the identification rule includes extracting a new token from a particular syntax field of an MAT request URL associated with the new flow, preceded by a particular semantic string specified by the identification rule;
    determining whether the new token is an identifier of the application as a result of applying the identification rule to the new flow; and
    classifying the new flow of the network traffic as being generated by the application when the new token is an identifier of the application,
    wherein the context comprises a co-occurring data segment in the flow within a pre-determined distance from where the token is located in the flow,
    wherein a frequency of the co-occurring data segment co-occurring with the token exceeds a pre-determined threshold in the plurality of flows, and
    wherein the identification rule specifies that the token is located within the pre-determined distance from the co-occurring data segment.

2. The method of claim 1,
    wherein the information associated with distributing the application from the pre-determined application distribution source comprises an application code set and application metadata,
    wherein the application code set comprises at least one selected from a group consisting of application executable code, application byte code, and application source code, and wherein the application metadata comprises metadata maintained by and downloadable from the software application distribution source.

3. The method of claim 1, wherein the plurality of flows are generated by the application under a controlled condition of a training phase, wherein the identification rule is generated during the training phase, and wherein the network traffic is classified during a classifying phase subsequent to the training phase.

4. The method of claim 1, wherein the context comprises a syntax field in the flow where the token is located, and wherein the identification rule specifies at least that the token is located in the syntax field.

5. The method of claim 1, wherein the context comprises a string in the flow within a pre-determined distance from where the token is located in the flow, wherein the string meets a pre-determined semantic criterion, and wherein the identification rule specifies at least that the token is located within the pre-determined distance from the string.

6. The method of claim 1, further comprising:

generating an identification rule result by applying the identification rule to the new flow obtained from the network traffic during a classifying phase subsequent to a training phase, wherein the network traffic is classified based on the identification rule result meeting a pre-determined criterion.

7. The method of claim 1, further comprising:

generating an identification rule result by applying the identification rule to the new flow obtained from the network traffic during a classifying phase subsequent to a training phase; and presenting the identification rule result to a network analyst user.

8. The method of claim 1, further comprising:

generating an identification rule result by applying the identification rule to the new flow obtained from the network traffic during a classifying phase subsequent to a training phase; and identifying, based on the identification rule result, another application from an application name directory, wherein the new flow is classified as being generated by the another application different than the application.

9. The method of claim 1, further comprising:

generating an identification rule result by applying the identification rule to the new flow obtained from the network traffic during a classifying phase subsequent to a training phase; and identifying, based on the identification rule result, another application from a plurality of application distribution data sets associated with a plurality of applications, wherein the new flow is classified as being generated by the another application in the plurality of applications that is different than the application.

10. A system for classifying network traffic in a network, comprising:

a hardware processor;

memory storing instructions executable by the hardware processor, the instructions comprising:

an acquisition module executing on the hardware processor and configured to:

obtain, from a pre-determined application distribution source, an application distribution data set of an application executing in the network, wherein the application distribution data set comprises information associated with distributing the application from the pre-determined application distribution source; and obtain, from the network traffic, a plurality of flows generated by the application;

a data extractor executing on the hardware processor and configured to:

extract, based on a pre-determined extraction criterion, a token from the application distribution data set of the application; and extract, in response to detecting the token in a flow of the plurality of flows, context information associated with the token in the flow;

an identification rule generator executing on the hardware processor and configured to:

generate an identification rule of the application based on the token and the context information, wherein the identification rule is expressed in XML format in order to describe heuristics of how to locate the token in a new flow, the identification rule including all of the following blocks delimited in XML format: (i) Rule and platform identification block, (ii) Rule priority block, (iii) App metadata fields indicated by the rule block, (iv) Match block, (v) "Not-Match" block, and (vi) Extraction block, wherein generating the identification rule includes analyzing transmission information during registration of the application with a service to identify syntax or other empirical rules describing how the application transmits identifiers; and a classifier executing on the hardware processor and configured to:

applying the identification rule to a new flow from the network traffic, wherein applying the identification rule includes extracting a new token from a particular syntax field of an HTTP request URL associated with the new flow, preceded by a particular semantic string specified by the identification rule;

determining whether the new token is an identifier of the application as a result of applying the identification rule to the new flow; and classifying the new flow of the network traffic as being generated by the application when the new token is an identifier of the application; and a repository for storing the application distribution data set, the token, and the identification rule, wherein the context comprises a co-occurring data segment in the flow within a pre-determined distance from where the token is located in the flow, wherein a frequency of the co-occurring data segment co-occurring with the token exceeds a pre-determined threshold in the plurality of flows, and wherein the identification rule specifies that the token is located within the pre-determined distance from the co-occurring data segment.

11. The system of claim 10, wherein the information associated with distributing the application from the pre-determined application distribution source comprise an application code set and application metadata,
wherein the application code set comprises at least one selected from a group consisting of application executable code, application byte code, and application source code, and
wherein the application metadata comprises metadata maintained by and downloadable from the software application distribution source.

12. The system of claim 10, wherein
the classifier executing on the hardware processor is further configured to classify, during a classifying phase, the new flow obtained from the network traffic using at least the identification rule,
wherein the plurality of flows are generated by the application under a controlled condition of a training phase prior to the classifying phase, and
wherein the identification rule is generated during the training phase.

13. The system of claim 10,
wherein the context comprises a syntax field in the flow where the token is located, and
wherein the identification rule specifies at least that the token is located in the syntax field.

14. The system of claim 10,
wherein the context comprises a string in the flow within a pre-determined distance from where the token is located in the flow,
wherein the string meets a pre-determined semantic criterion, and
wherein the identification rule specifies at least that the token is located within the pre-determined distance from the string.

15. The system of claim 10, wherein the classifier is further configured to:
generate an identification rule result by applying the identification rule to the new flow,
wherein the network traffic is classified based on the identification rule result meeting a pre-determined criterion.

16. The system of claim 10, wherein the classifier is further configured to:
generate an identification rule result by applying the identification rule to the new flow obtained from the network traffic during a classifying phase subsequent to a training phase; and
present the identification rule result to an network analyst user.

17. The system of claim 10, wherein the classifier is further configured to:
generate an identification rule result by applying the identification rule to the new flow obtained from the network traffic during a classifying phase subsequent to a training phase; and
identify, based on the identification rule result, another application from an application name directory,
wherein the new flow is classified as being generated by the another application different than the application.

18. The system of claim 10, wherein the classifier is further configured to:

generate an identification rule result by applying the identification rule to the new flow Obtained from the network traffic during a classifying phase subsequent to a training phase; and
identify, based on the identification rule result, another application from a plurality of application distribution data sets associated with a plurality of applications,
wherein the new flow is classified as being generated by the another application in the plurality of applications that is different than the application.

19. A non-transitory computer readable medium storing instructions for classifying network traffic in a network, the instructions, when executed by a processor of a computer, comprising functionality for:
obtaining; from a pre-determined application distribution source, an application distribution data set of an application executing in the network, wherein the application distribution data set comprises information associated with distributing the application from the pre-determined application distribution source;
extracting, based on a pre-determined extraction criterion, a token from the application distribution data set of the application;
obtaining, from the network traffic, a plurality of flows generated by the application;
extracting, in response to detecting the token in a flow of the plurality of flows, context information associated with the token in the flow;
generating an identification rule of the application based on the token and the context information; wherein the identification rule is expressed in XML format in order to describe heuristics of how to locate the token in a new flow, the identification rule including all of the following blocks delimited in XML format: (i) Rule and platform identification block, (ii) Rule priority block, (iii) App metadata fields indicated by the rule block, (iv) Match block, (v) "Not-Match" block, and (vi) Extraction block, wherein generating the identification rule includes analyzing transmission information during registration of the application with a service to identify syntax or other empirical rules describing how the application transmits identifiers;
applying the identification rule to a new flow from the network traffic; wherein applying the identification rule includes extracting a new token from a particular syntax field of an HTTP request URL associated with the new flow, preceded by a particular semantic string specified by the identification rule;
determining whether the new token is an identifier of the application as a result of applying the identification rule to the new flow; and
classifying the new flow of the network traffic as being generated by the application when the new token is an identifier of the application,
wherein the context comprises a co-occurring data segment in the flow within a pre-determined distance from where the token is located in the flow,
wherein a frequency of the co-occurring data segment co-occurring with the token exceeds a pre-determined threshold in the plurality of flows, and
wherein the identification rule specifies that the token is located within the pre-determined distance from the co-occurring data segment.

20. The non-transitory computer readable medium of claim 19, wherein the information associated with distributing the application from the pre-determined application distribution source comprise an application code set and application metadata, wherein the application code set comprises at least one selected from a group consisting of application executable code, application byte code, and application source code, and wherein the application metadata comprises metadata maintained by and downloadable from the software application distribution source.

21. The non-transitory computer readable medium of claim 19, wherein the plurality of flows are generated by the application under a controlled condition of a training phase, wherein the identification rule is generated during the training phase, and wherein the network traffic is classified during a classifying phase subsequent to the training phase.

22. The non-transitory computer readable medium of claim 19, wherein the context comprises a syntax field in the flow where the token is located, and wherein the identification rule specifies at least that the token is located in the syntax field.

23. The non-transitory computer readable r Tedium of claim 19, wherein the context comprises a string in the flow within a pre-determined distance from where the token is located in the flow, wherein the string meets a pre-determined semantic criterion, and wherein the identification rule specifies at least that the token is located within the pre-determined distance from the string.

24. The non-transitory computer readable medium of claim 19, the instructions, when executed by the processor of the computer, further comprising functionality for:

generating an identification rule result by applying the identification rule to the new flow obtained from the network traffic during a classifying phase subsequent to a training phase, wherein the network traffic is classified based on the identification rule result meeting a pre-determined criterion.

25. The non-transitory computer readable medium of claim 19, the instructions, when executed by the processor of the computer, further comprising functionality for:

generating an identification rule result by applying the identification rule to the new flow Obtained from the network traffic during a classifying phase subsequent to a training phase; and presenting the identification rule result to a network analyst user.

26. The non-transitory computer readable medium of claim 19, the instructions, when executed by the processor of the computer, further comprising functionality for:

generating an identification rule result by applying the identification rule to the new flow obtained from the network traffic during a classifying phase subsequent to a training phase; and identifying, based on the identification rule result, another application from an application name directory, wherein the new flow is classified as being generated by the another application different than the application.

27. The non-transitory computer readable medium of claim 19, the instructions, when executed by the processor of the computer, further comprising functionality for:

generating an identification rule result by applying the identification rule to the new flow obtained from the network traffic during a classifying phase subsequent to a training phase; and identifying, based on the identification rule result, another application from a plurality of application distribution data sets associated with a plurality of applications, wherein the new flow is classified as being generated by the another application in the plurality of applications that is different than the application.

* * * * *